INVENTOR:
Ladislav HALADA
BY Arthur O. Klein
his Attorney

INVENTOR:
Ladislav HALADA
by: Arthur O. Klein
his Attorney

Oct. 22, 1968 L. HALADA 3,406,453
METHOD AND APPARATUS FOR GRAPHICALLY ILLUSTRATING THE
CONTINUOUS MOVEMENT OF AN OBJECT
Filed April 4, 1967 8 Sheets-Sheet 3

INVENTOR:
Ladislav HALADA
by: Arthur O. Klein
his Attorney

Oct. 22, 1968  L. HALADA  3,406,453
METHOD AND APPARATUS FOR GRAPHICALLY ILLUSTRATING THE
CONTINUOUS MOVEMENT OF AN OBJECT
Filed April 4, 1967  8 Sheets-Sheet 4

INVENTOR:
Ladislav HALADA
by: Arthur O. Klein
his Attorney

INVENTOR:
Laolislav HALADA
BY Arthur O. Klein
his Attorney

United States Patent Office
3,406,453
Patented Oct. 22, 1968

3,406,453
METHOD AND APPARATUS FOR GRAPHICALLY ILLUSTRATING THE CONTINUOUS MOVEMENT OF AN OBJECT
Ladislavo Halada, Prague, Czechoslovakia, assignor to Ustredni reditelstvi ceskoslovenskeho filmu, Prague, Czechoslovakia, a corporation
Filed Apr. 4, 1967, Ser. No. 628,398
7 Claims. (Cl. 33—23)

ABSTRACT OF THE DISCLOSURE

A method and apparatus for drawing which is derived by way of a pair of swingable bows which are operatively connected through suitable lever transmissions with a drawing means which provides a drawing according to a pair of mutually perpendicular axes, each bow being operatively connected with a carriage means which moves with respect to a given programming structure to derive from the latter a program for controlling the swinging movement of the bows. These bows are respectively guided by a guide means which includes at least one elongated strip which is operatively connected through the lever transmission to the drawing means, so that as the bow moves with respect to the latter guide means the drawing means will be controlled to provide an illustration of a given movement in accordance with respect the programming derived for the control of the movement of the carriage means.

Background of the invention

The invention relates to a method and apparatus for graphically laying out a continuously moving object such as an object which is continuously changing its shape. Such layouts can be used in particular in animated films, in architecture, and in advertising.

Operations carried out in connection with animated film up to the present time require exacting hand operations of qualified phase draftsman who lay out the primary movement drawing of an animator into a series of intermediate phases by means of which the flowing, continuous changes in form from one drawing to the next, in accordance with a predetermined scale of time layouts, is broadened out often in a non-uniform manner. Similar exacting work is required for the illustration of strata lines for projected and curved surfaces in architecture or for the formation of complex rhythmic structures in advertisement drawings, similar to the development of solids of any configuration. Up to the present time, there are no accurate devices which are capable of automating this work at least in part for the purpose of accurately carrying out and accelerating the work as well as for eliminating errors in the illustration of transitional forms.

Summary of the invention

It is a primary object of the invention to eliminate all of these disadvantages.

In particular, it is an object of this invention to partly or fully automate the graphic layout of the continuous form changing by way of programming initial, intermediate, and end phases of the movement of an object, in such a way that the intermediate phase of the movement of an object determines the time scale for the transition between the initial and end phases of the movement thereof.

With the present invention, some known methods and apparatus are used such as, for example, a drawing frame as a coordinator which is capable of coordinating a pair of mutually perpendicular movements according to $x$ and $y$ axes in a drawing, so that in accordance with the invention such known methods can be combined together in such a way that the program corresponds to three drawings of the initial, intermediate, and end phases of a given movement, and the three-dimensional illustration for each point of these three programs, three for the $x$ axis and three for the $y$ axis, are evaluated by means of a pair of swingable bows which respectively make possible, in the direction of its $x$ axis or its $y$ axis, the movement of the intermediate phase in a uniform or non-uniform manner which appears as a retarding motion, an accelerating motion, or a reverse motion. The coordination of the scales for these movements makes possible the resulting movement of the phase form along a straight line, curve, or a circle or distorted path and a change in form as well as a lateral rotary movement.

With the control of the movement according to a pair of $x$ and $y$ ordinates for each of the programmed drawings, it is possible to use a known method which, for example, is of the type used for the programming control of a machine tool.

These methods can be carried out with the aid of a device which also forms part of the invention and which also uses in part some known elements. This device, which is referred to below for the sake of simplicity as a phasograph, is described in greater detail below.

Brief description of drawings

The invention is illustrated by way of example in the accompanying drawings which form part of this application and in which.

Description of preferred embodiments

Figure 1A:
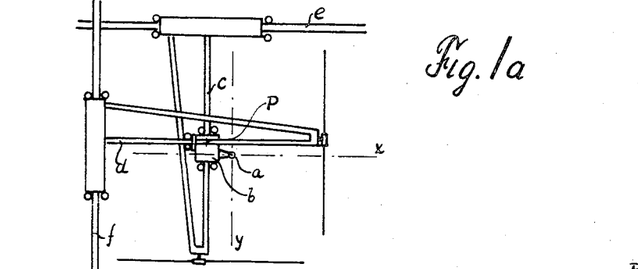
FIG. 1a illustrates a known device which acts as a coordinator for laying out movements according to a pair of axes $x$, $y$ which are mutually perpendicular to each other.

The basic component of the phasograph of the invention is formed by a known drawing frame in the form of the coordinator of FIG. 1a where the drawing pencil a is fastened to a slide b which is fixed above the intersection point P of a pair of mutually perpendicular linear guides c and d. The linear guide c moves along a rail or track e in the direction of the axis x, while the linear guide d moves along a track or rail f in the direction of the axis y.

The drawing which is made by the drawing pencil a, by way of its movement at the limited area of the drawing, is laid out in the device into two programs having interrelated synchronized movements which determine the interrelated movement speeds of the pair of linear guides c and d.

Figure 1B:
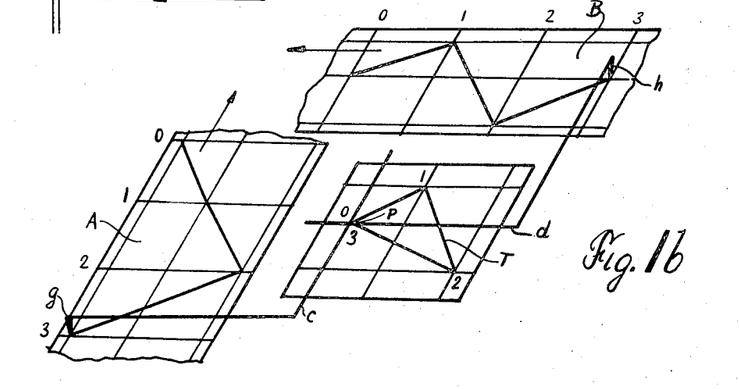
FIGS. 1b and 1c respectively illustrate two examples of a drawing layout into a pair of graphic illustrations A and B.
Figure 1C:
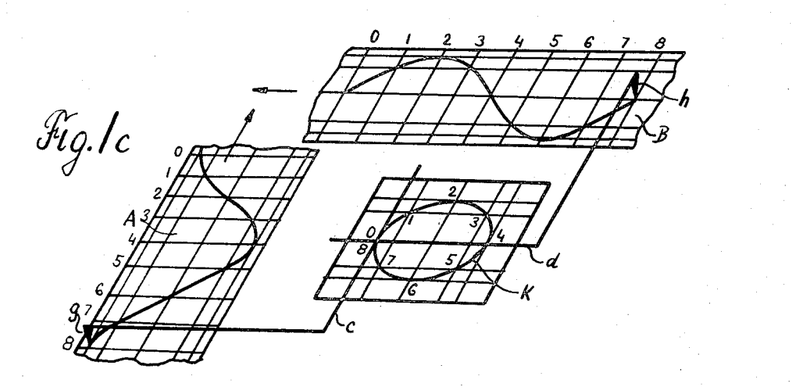

The interrelated adjoining illustrations of FIGS. 1b and 1c are a pair of practical embodiments which are transformed by way of the drawing frame of FIG. 1a into the straight-line and curved configurations in a continuous drawing at regular time intervals. In these adjoining drawings of FIGS. 1b and 1c the linear guides c and d are schematically illustrated by the straight lines c and d. If the movement of the straight lines c and d of FIGS. 1b and 1c, which represent the guides c and d of FIG. 1a, is transferred to a pair of pencils g and h to provide a programmed illustration of the movement while the program tapes A and B are moved in the directions of the arrows indicated in FIGS. 1b and 1c, then the triangle T of FIG. 1b, which is drawn in the sequence 0, 1, 2, 3, will form at the pair of program tapes A and B the corresponding drawings illustrated in FIG. 1b. Through the reverse or feed-back reproduction of these drawings a movement of the linear guides c and d will be achieved which will produce for the intersection point P the path 0–3 of the triangle T.

For the circle K which according to FIG. 1c is drawn in the sequential series of points 0, 1, 2–8, the illustration on the tape A for the axis x is a cosine while the illustration on the tape B for the axis y is a sine, so that cosinusoidal and sinsusoidal curves are provided in this way at the tapes A and B, respectively.

In this way any shape, any straight line, and any curve can be graphically illustrated.

In order that the device can evaluate the movements of intermediate phases, it is necessary to maintain during continuous programming an accurate time synchronization so that the several programs will have the same length and will be reproduced at the same time indications of all coinciding points.

Figure 2A:
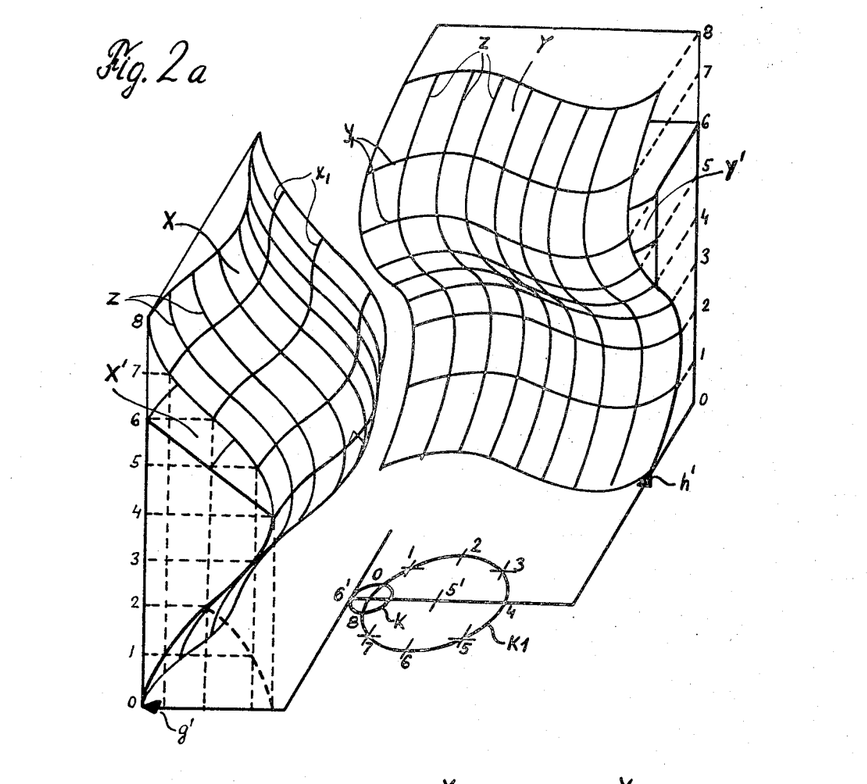
FIG. 2a illustrates in a schematic perspective view a representation of a drawing form and the phase movement of a drawing at a pair of curved surfaces.

The interconnection of the phases is illustrated in FIG. 2a. The circular line K is to be moved along a circular path K1 in the directions 0, 1, 2–8. The illustrated circle K does not change its size, so that the program illustration of its path in each given location will have the same configuration. The only change will be in the location on the drawing. If the program drawings are made into a large number of intermediate phases, for example on paper strips, which are cut out as templates and then situated closely beside each other, then the edges will form cohesive, continuous, or substantially continuous, curved surfaces X and Y, as indicated in FIG. 2a. The elevation lines x1 and y1, all of which extend horizontally and coincide with the plane of the drawing surface, determine the shape of the drawing and the vertical reference lines z then determine the path of movement of each point of the drawing. The circular movement forms in the vertical direction also a sinusoid and a cosinusoid.

In the event that the illustrated circle K is to be moved along a semi-circular path 0, 1, 2, 3, 4 (FIG. 2a) and then along a straight path 4, 5', 6', then the section derived from the straight-line movement produces at the program curves the configurations X' and Y'.

If now the drawing pencils g, h of FIGS. 1b and 1c are replaced by copying or follower pins g' and h' (FIG. 2a), then these follower or tracing pins g' and h' will copy during the synchronous movement of both surfaces of FIG. 2a in a horizontal direction a predetermined horizontal reference line x1, y1 and the device will illustrate the corresponding phase of the circle K. Then the pair of curved surfaces of FIG. 2a move through a predetermined increment in a vertical direction and the device can copy another pair of horizontal reference lines x1, y1, so as to illustrate a new movement phase.

During continually developed movement, the surface measuring in the vertical direction will increase by further program additions. The curved surfaces can be laid out in accordance with FIG. 2b. The horizontal reference lines can be copied one after the other in the direction 0, 1, 2. The further or next section 2, 3, 4 is reversed in the manner of a mirror image and is therefore copied in a reverse direction from the bottom to the top. The section 4, 5, 6 has a normal location and is copied in a downward direction, and so on. For a configuration X' and Y' an analogous copying procedure is carried out: 0, 1, 2—2, 3, 4—4, 5', 6'. This procedure is schematically illustrated at X and Y in FIG. 2b.

Figure 2B:
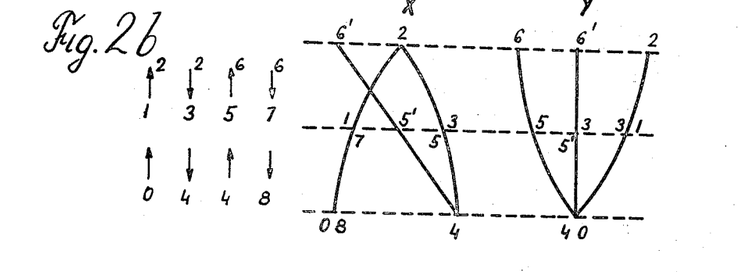
FIG. 2b illustrates the possibility of laying out the curved surfaces in small sections where the elements are shown in the initial, intermediate, and end phases.

The example according to FIG. 2b is laid out in the phasograph of the invention in the following manner: The circular movement of the circle K (FIG. 2a) is laid out by the animator in eight phases. For this operation of the device the phases 0, 2, 4, 6, 8 or 6' are the primary phases, and the phases 1, 3, 5, 7 or 5' the intermediate phases. The phase 0 is the initial phase, the phase 2 is the end phase, and the intermediate phase 1 determines the character of the transition. In the device of the invention these three programs operate simultaneously at a predetermined distance one over the other and the closeness or density of the curved surfaces which make possible the formation of any desired number of intermediate phases is replaced by the bow 1 of FIG. 3a which by way of its swinging movement forms in an uninterrupted manner a continuous connection of the adjoining locations of each point in three drawings A0, A1, A2.

Figures 3A, 3B:
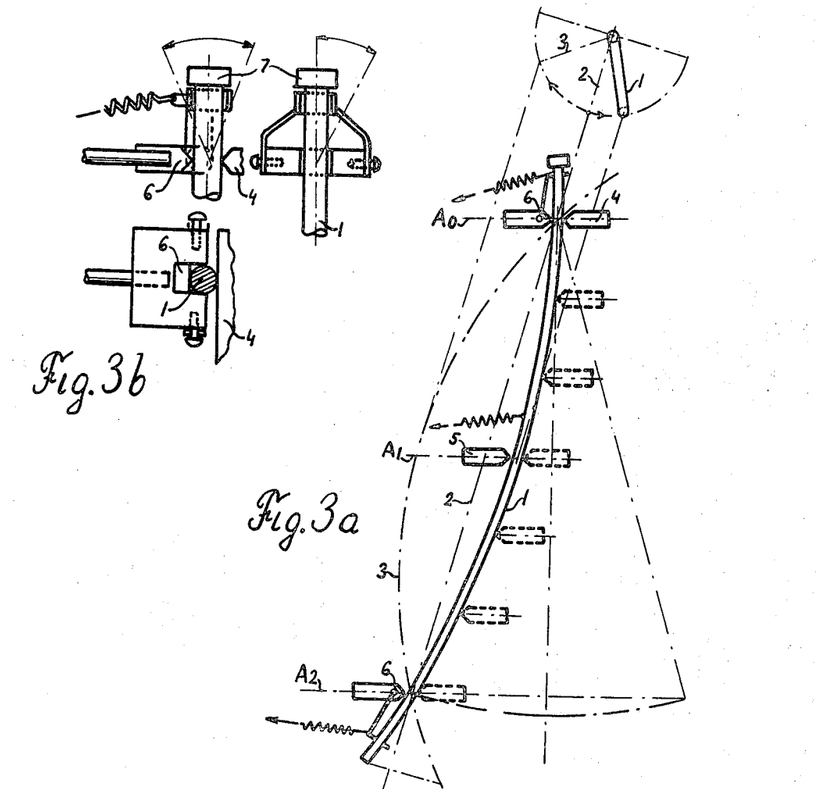
FIGS. 3a, 3b, and 3c illustrate a practical embodiment of a swingable bow which makes possible a continuous connection of three points which move at the same time and which replace the curved surfaces of FIGS. 2a and 2b.
Figure 3C:
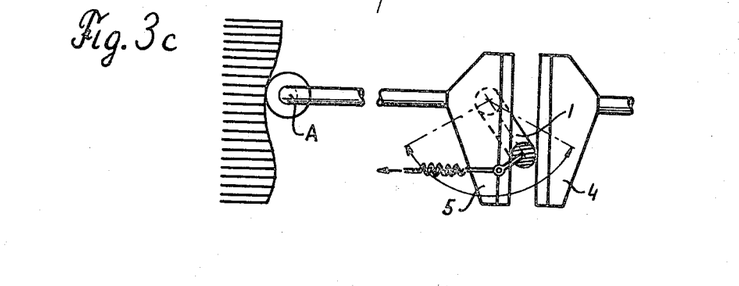

In its central position the swingable bow 1 of FIG. 3a appears as a straight-line 2 and provides during the layout a uniform rate of increase in the movement. The more one of the point drawings of the central phase A1 is swung outwardly from this central position, the more the bow 1 becomes inclined toward the location 3 at one side or the other side and in the individual phases the rate of change of movement appears non-uniform and produces a resulting movement as an accelerated, a retarded, or a reverse movement at such a ratio as this rate of change of movement is determined by the position of the points A0, A1, A2 on the program drawing.

In the individual phases a shiftable positioning strip 4 moves along the bow 1 (FIG. 3a), this strip 4 extending parallel to the strip 5 which is fixed to the follower or copy pin of the central phase A1. The bow 1 slides during its outward swinging movement along the edges of the parallel strips 4 and 5 and its extent of outward swinging movement from the axis 2 does not influence the gradual transition. In its upper portion the bow 1 is held by means of a holder (FIG. 3b) which makes it possible to swing the bow in all directions. The edge of the movable strip 4 can be shifted outwardly into the upper location A0 precisely opposite the edge 6 of the upper holder. The lower holder which is of the same construction as the upper holder is angularly displaced with respect to the latter by 180°. At its upper end the bow 1 carries a stop 7 which limits its downward movement while at its lower end it has no stop. Thus, during swinging of the bow 1 it can move or slide freely through the lower holder. Each holder includes a notched member having edge 6 and receiving bow 1 in the notch as well as in a ring of a swingable arm pivoted to the notched member and acted on by a spring to hold bow 1 against edge 6.

Figure 4:
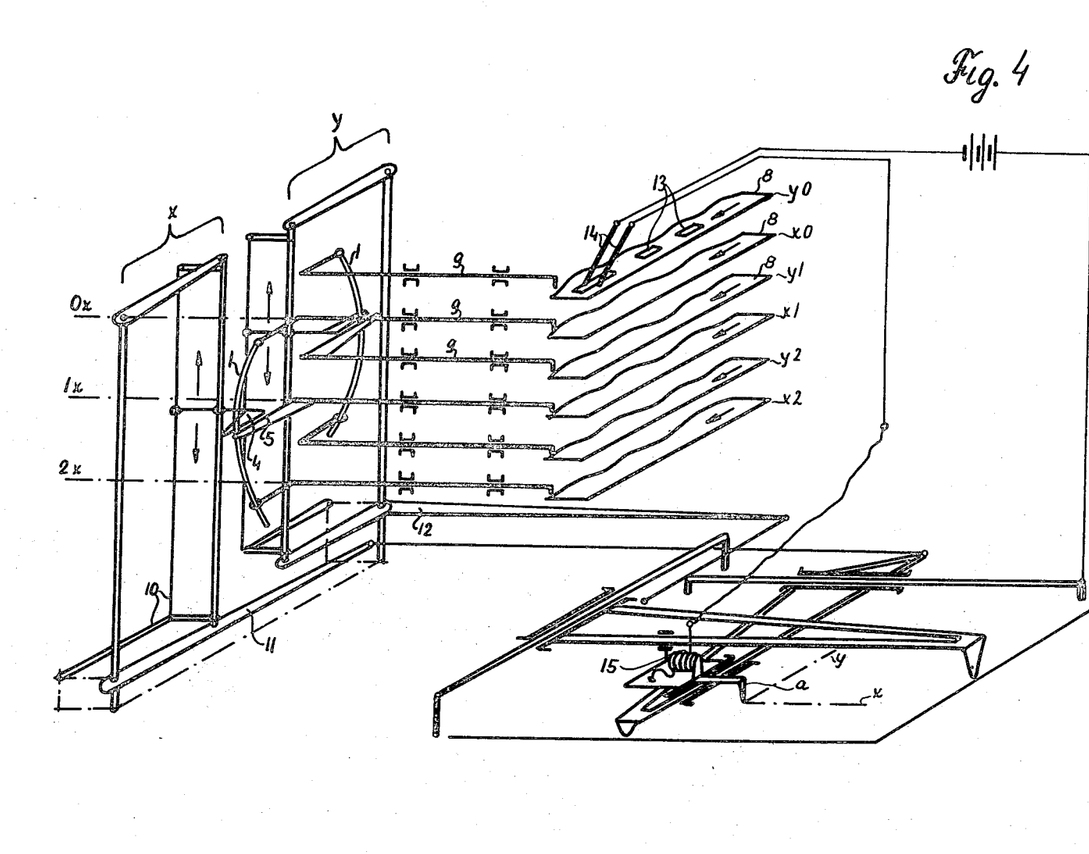
FIG. 4 is a schematic perspective illustration of a practical embodiment of a phasograph of the invention.

The bow 1 performs in the phasograph the function of a straight guide which has the possibility of being elastically curved and thus can connect in an uninterrupted manner three points having different positions with respect to each other. As an example, there is schematically shown in FIG. 4 a model which has been tested. The paper templates 8 are copied by means of a copying carriage 9 which is spring-urged against the template edges and to which the bows 1 are movably connected for continuously evaluating the phase changes. The drawings for the $x$ axis are provided by way of the bow 1 with the aid of the strip 4 which by means of the parallelogram linkage device 10 is held parallel to the guide strip 5. The strip 4 is gradually moved up and down, by any suitable structure, in the regions from $0x$ to $2x$ in accordance with the number of predetermined intermediate phases, and its movement is transmitted by means of a lever 11, which turns about a fixed axis and forms part of the parallelogram linkage, to a drawing frame of the type described above in connection with FIG. 1. For the $y$ axis a device similar to that used for the $x$ axis is used, this device having the same elements 1, 4, 5 and 10 described in connection with the device used for the $x$ axis. The resulting movements are transmitted by way of a two-armed bell crank lever 12 in the direction of the $y$ axis. The impulses for determining where the operation of the drawing pencil $a$ should be interrupted, at those locations where the line is to be interrupted, are derived by way of metal foils 13 which bridge the gap between the contact springs 14 and deliver the electrical current to the electromagnet 15, which, when energized, raises the drawing pencil $a$.

With the illustrated device the drawing is transmitted from the drawing frame to the paper program strips at points which can then be interconnected by a curved linear guide. By cutting out the paper strips along these lines there is provided a guide edge of the template for the copy pin or roller.

During a phase layout of a continuously moving object the templates are exchanged in such a way that a progression is made from the template corresponding to the initial phase to the template corresponding to the final phase. At the end of an operating cycle the template for the initial and intermediate phases are exchanged, the end templates for the $x$ and $y$ axes remaining at their positions and being used as initial or starting templates for the next phases. Each template for an end phase serves during the next-following cycle as a template for the initial phase. The programming is carried out in the same series. The templates can be fixed to a pulling frame or they can be provided with perforations and synchronously taken up on rotary spools.

The preparation of templates used in the test model is relatively complex. For providing a graphic illustration with respect to the chronological movement of the location, in the final embodiment of the phasograph, it is of advantage to use a few known drawing methods with respect to the size of the ordinates, in a manner similar to the programmed control of machine tools by means of sound tapes, punch cards, or graphic follower devices, as is used in analog calculators.

Figure 5:
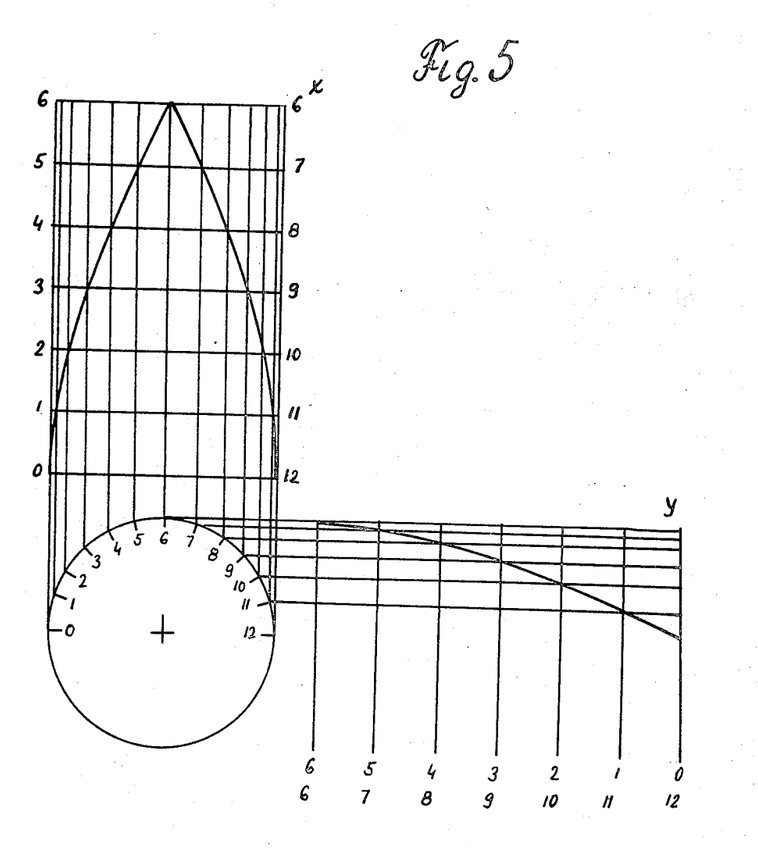
FIGS. 5 and 6 illustrate three basic possibilities for handling a circular movement.

The bow 1 (FIG. 3a) simulates in a relatively accurate manner the movement of a sinusoid which is shown laid out in FIG. 2b. In FIG. 5 the phase movement of a single point along a circular path is illustrated. The points 0, 1, 2–6 illustrate the uniform division of a quarter-circle. At the left half of the curve $x$ is shown the precise layout, with the corresponding quarter-circle of the sinusoid. In the right half the same layout is shown but the points 6, 9 and 12 have been joined by a bow. The resulting error is indicated in the diagram by deviations from the original curve. The interconnection of the same errors along the $x$ and $y$ axes provides again a circular path, except that the points 8, 9 and 10 are closer to each other while the distance between the sections 6, 7 and 11, 12 is increased.

Figure 6:
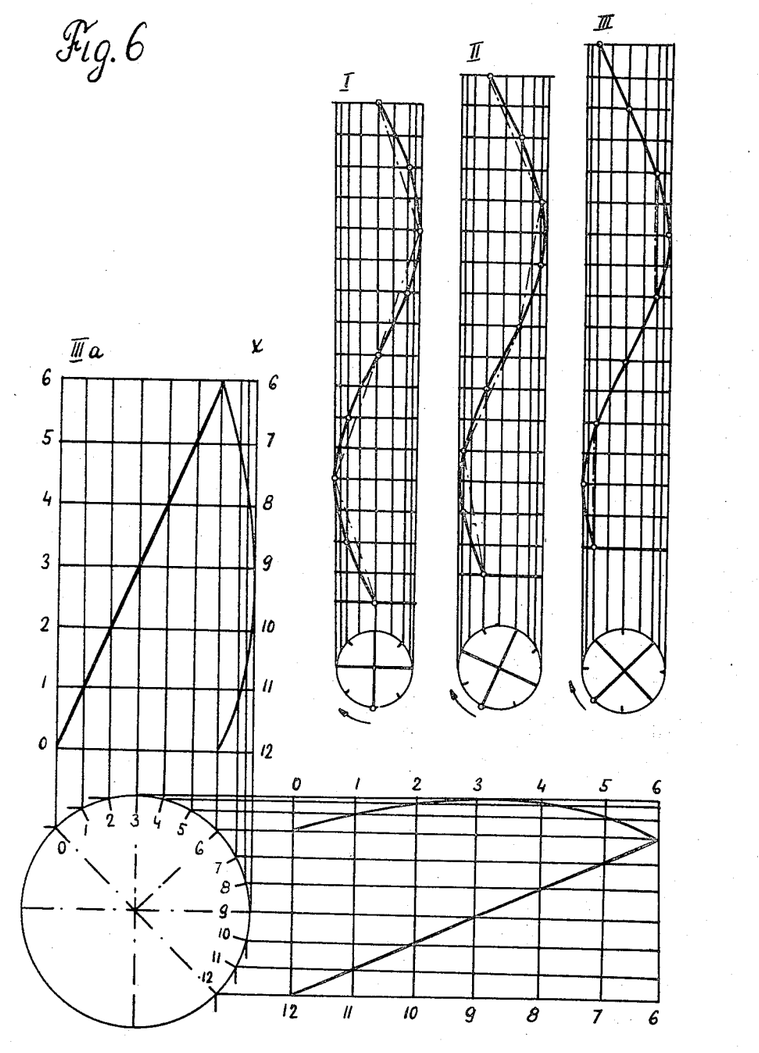

In the illustrations I, II, III of FIG. 6 there are three basic types of sinusoidal paths illustrated in the way they are provided by way of the swingable bow 1 depending upon the initial phase of the circular path. The curve I shows an example of FIG. 5, the curve III shows the example IIIa of FIG. 6. The curve II represents a transition between I and III. From these drawings it is apparent that the phase movement can have any desired length, but its curvature must not exceed a quarter of a circle between the initial and final phases.

Figure 7:
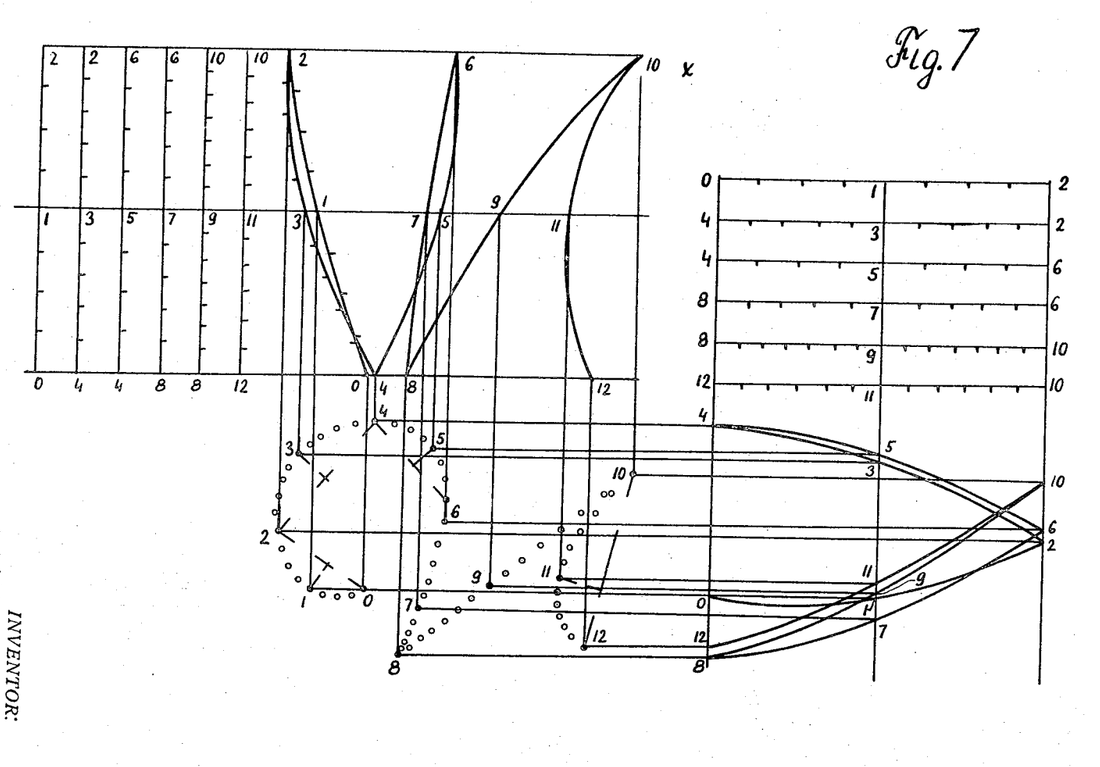
FIG. 7 illustrates the development of the continuous, flowing movement of a single point.

In FIG. 7 the development of a moving process or function is ilustrated. In this case, the movement of a single point is illustrated, this point moving along a given path through twelve points 0–12 which limit the path and where the even numbered points are primary, initial, and final phases, while the odd numbered points are those which are to be considered as determining the transition characteristics of the intermediate phases. In the diagrams $x$ and $y$ are illustrated the corresponding movement of the position of the bow 1. The height of the bow is schematically shown smaller. The actual height of the bow must be chosen in such a way that during its outward swinging movement it will achieve the longest required movement along the total width of the drawing format.

In FIG. 7 the laws which determine the configurations of the movement by the locations of intermediate phases are shown at a few examples: The point of the middle phase 3 is situated beyond the line which interconnects the points 2, 4. Since it is equidistant from both points, it determines the path of movement along the bow. The point 11 is situated beyond the line interconnecting the points 10, 12. Since it is nearer to the point 12, however, it determines a path similar to a parabola where the intermediate phases are situated more distant from each other at the lesser curved sections 10, 11 and are closer to each other in a direction toward the mover greatly curved section 11, 12. When this parabolic path is to be indicated by movement at a constant speed and thus with a uniform point distribution, then it is essential that this path be laid out into a pair of arcuate sections at least one of which still indicates an intermediate phase. A similar situation is provided by the path 4, 5, 6, 7, 8, which is a combination of a distinctly curved bow 4, 5, 6 and a longitudinal section 6, 7, 8. The point 7 is apparently displaced more toward the point 8, so that in this case an approach of the points toward each other and thus a retarding in the movement takes place. In a similar manner the location of the point 9 determines at the straight line 8, 10 the movement-time scale. If the point 9 is situated precisely at the center of the straight line, then the bows 1 in the diagram $x$ and $y$ of FIG. 7 will appear at their central positions as straight lines and the result would be a uniform straight-line movement. This function is essentially the same as that used in continuous animation practice for cartoon films. By a suitable layout of the primary and end phases it is possible to reproduce a given movement. The acceleration or deceleration time scale at the parabolic form corresponds precisely to the laws with respect to the geometric illustration of movements in space.

All of the above errors which are inherent in the device are so small that they cannot be perceived by the eye during film projection. They are only unimportant deviations in the speed of movement and in the curvature of the path which during the phase layout by hand are eliminated by different draftsmen in different ways.

These unimportant deviations do not influence in any case the actual configuration of the drawing which retains its character precisely according to the programmed information.

Figure 8A:
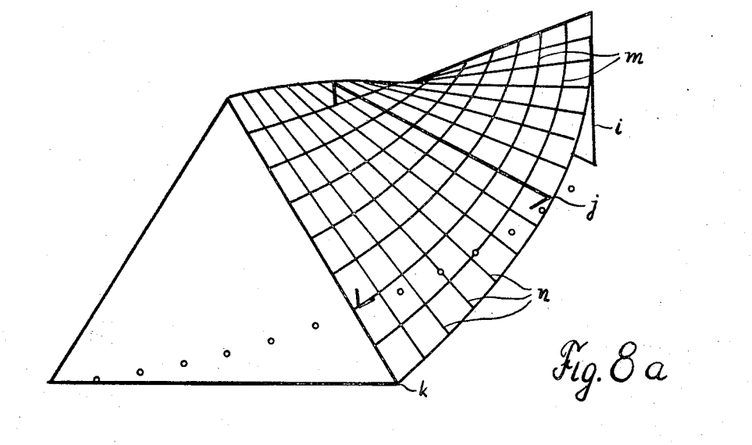
FIGS. 8a and 8b respectively illustrate examples of the movement of a form which carries out a lateral rotary motion.
Figure 8B:
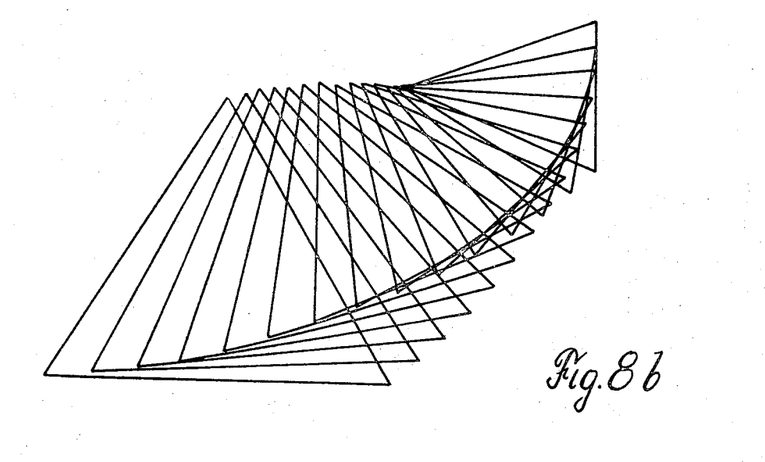

FIGS. 8a and 8b illustrate phases of a triangle which is displaced or enlarged, changing its proportions and carrying out a lateral turning. FIG. 8a shows the initial, middle, and end phases, i, j, k. The curves m interconnect three points whose locations are taken from the program at the same instant. The curves m illustrate the paths of movement for individual points which are determined by the middle phases whose evaluation is carried out by the bow 1 of the phasograph. The middle phase determines at the same time the time scale of the intermediate phases. As is apparent at the projected surface of FIG. 8a, which coincides with the continuity of the changes in curvature of the path m, the time scale at each path changes so that the side n of one triangle at each intermediate phase is illustrated as a straight line.

Also in this case there is the basic feature according to which the length of the movement can have any desired value, the lateral turning must, however, not exceed 90° between the initial and final phases.

It is apparent that the device according to the above-described examples can be changed for special purposes in different ways as when used in architecture, in advertising, in evaluation of strata lines of meteorological cards, ballistics, etc., without departing from the essence of the invention.

What is claimed is:

1. In a method for providing for the movement of a given object a graphic layout which can subsequently be used to illustrate the movement of the object, the steps of operatively connecting to a pair of swingable bows, which are operatively connected to a drawing instrument which illustrates the movement of the object with respect to a pair of mutually perpendicular axes with the pair of bows respectively determining the position of the drawing instrument with respect to said axes, three continuous programming structures for each bow with each of these structures providing a continuous program for a cycle including the initial, intermediate and end phases of the movement of the object with the intermediate phase determining the transition rate from the initial to the end phase and with the three programs of the programming structures connected to one bow operating in synchronism with the three programs of the programming structures connected to the other bow to provide by way of the intermediate phase a rate of movement which can either be an acceleration, a deceleration, or a reverse movement, and achieving a continuity of phase change by exchanging the programming in a manner utilizing the end phase of one cycle as the starting phase of the next cycle so that an uninterrupted illustration of a series of program drawings can be used for illustrating the movement of the object.

2. In a method as recited in claim 1 and wherein for the case where a given cycle repeats itself a single cycle is programmed in its primary form and this cycle is repeatedly used in a stereotyped manner with the drawing resulting therefrom being shifted with respect to its adjoining drawings according to the phase of the repeated cycle.

3. In a method as recited in claim 1 and wherein for the case of a given cycle which is repeated a single cycle in its primary form is programmed and is repeatedly used in a streotyped manner with the resulting drawing being reduced in its scale up to a single point reducing the lever arm which reproduces the drawing according to said axes.

4. In a method as recited in claim 1 and wherein for the case where a single cycle is repeatedly used the cycle is programmed in its principal form and is then repeatdly reproduced in a stereotyped manner while being shifted with respect to adjoining cycles and being reduced in its scale up to a point along said axes.

5. In a method as recited in claim 4, and wherein for the case where a wide angle film is to be made, the drawing is programmed at its actual width while the phase illustration has a scale controlled by the transmitting lever of the structure in such a ratio that the resulting drawing along one of said axes has a normal film format while for the drawing a wide marking pen is used which in one of said axes provides a thicker line than in the other axis so that the resulting drawing can be received by normal optical devices without any accessories in order to improve the picture quality.

6. In an apparatus for illustrating the continuous movement of a given object, a pair of swingable bows, first means connected to one of said bows for translating the movement thereof into the movement of a drawing instrument which reproduces the movement along one axis and second means operatively connected to the other of said bows for translating the movement thereof into movement of the drawing instrument along a second axis perpendicular to said one axis, carriage means carrying said bows and moving with respect to given program templates for transmitting to said bows movements taken from the latter templates, guide means having a pair of parallel strips and operatively connected with each bow to provide for lateral swinging thereof between said pair of parallel strips of said guide means, a change in the curvature of the bow being transmitted to one of said parallel strips which during one cycle moves in individual phases in one direction from point to point of said phase and then during the next cycle in the reverse direction from point to point of the next phase, and linkage means for translating the movements of said guide means at a given transition ratio to said first and second means which form a drawing.

7. Apparatus as recited in claim 6 and wherein an automatic programming means is operatively connected with said carriage means for determining the rate of movement thereof according to a predetermined program.

References Cited

UNITED STATES PATENTS 1,928,559   9/1933   Darnhofer.
2,091,060   8/1937   Watson.

FOREIGN PATENTS 290,696   11/1931   Italy.

HARRY N. HAROIAN, *Primary Examiner.*